United States Patent
Lee et al.

(10) Patent No.: US 9,954,218 B2
(45) Date of Patent: Apr. 24, 2018

(54) ANODE FOR SECONDARY BATTERY, AND LITHIUM SECONDARY BATTERY MANUFACTURED THEREFROM

(71) Applicant: SK Innovation Co., Ltd., Seoul (KR)

(72) Inventors: Jee Hee Lee, Daejeon (KR); Sang Jin Kim, Daejeon (KR); Jung Hwan Kim, Daejeon (KR); Hyo Sang Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 15/182,857

(22) Filed: Jun. 15, 2016

(65) Prior Publication Data

US 2016/0372751 A1     Dec. 22, 2016

(30) Foreign Application Priority Data

Jun. 19, 2015   (KR) .................... 10-2015-0087364

(51) Int. Cl.
| | |
|---|---|
| *H01B 1/24* | (2006.01) |
| *H01M 4/36* | (2006.01) |
| *H01M 4/133* | (2010.01) |
| *H01M 4/587* | (2010.01) |
| *H01M 4/62* | (2006.01) |
| *H01M 10/052* | (2010.01) |

(52) U.S. Cl.
CPC .............. *H01M 4/133* (2013.01); *H01B 1/24* (2013.01); *H01M 4/364* (2013.01); *H01M 4/587* (2013.01); *H01M 4/621* (2013.01); *H01M 4/625* (2013.01); *H01M 10/052* (2013.01)

(58) Field of Classification Search
CPC ... H01B 1/00; H01B 1/04; H01B 1/20; H01B 1/22; H01B 1/24; H01M 4/36; H01M 4/624
See application file for complete search history.

(56) References Cited

U.S. PATENT DOCUMENTS

| | | | |
|---|---|---|---|
| 7,906,240 B2 | 3/2011 | Ishii et al. | |
| 8,728,668 B2 * | 5/2014 | Kawai .................. | H01M 4/0404 429/231.8 |

(Continued)

FOREIGN PATENT DOCUMENTS

| | | | |
|---|---|---|---|
| JP | 2008166047 A | * | 7/2008 |
| JP | 4760379 B2 | | 8/2011 |

OTHER PUBLICATIONS

Chen et al "Comparative study of carbon black and graphite powder as carbon source for PM compacts", Power Metallurgy 2010 vol. 53, No. 1, 51-56.*

*Primary Examiner* — Mark Kopec
(74) *Attorney, Agent, or Firm* — The Webb Law Firm

(57) ABSTRACT

Provided is an anode for a secondary battery including: a first anode active material; and a second anode active material having relatively lower hardness than that of the first anode active material. The first anode active material and the second anode active material satisfy Relational Formula 1 $0.167<R_B/R_A<1$, and have a volume ratio of 1:0.5~2. In Relational Formula 1, $R_A$ is an average particle size of the first anode active material, and $R_B$ is an average particle size of the second anode active material.

7 Claims, 4 Drawing Sheets

(56) References Cited

U.S. PATENT DOCUMENTS

| | | | |
|---|---|---|---|
| 2014/0356734 A1* | 12/2014 | Ren | H01M 10/0567 |
| | | | 429/338 |
| 2015/0200402 A1* | 7/2015 | Yoshimoto | C08J 5/18 |
| | | | 429/530 |
| 2015/0333324 A1* | 11/2015 | Umeyama | H01M 4/1391 |
| | | | 429/221 |
| 2016/0190596 A1* | 6/2016 | Mah | H01M 4/134 |
| | | | 429/218.1 |

* cited by examiner

ANODE FOR SECONDARY BATTERY, AND LITHIUM SECONDARY BATTERY MANUFACTURED THEREFROM

CROSS-REFERENCE TO RELATED APPLICATION

This application claims priority to Korean Patent Application No. 10-2015-0087364 filed Jun. 19, 2015, the disclosure of which is hereby incorporated in its entirety by reference.

TECHNICAL FIELD

The following disclosure relates to an anode for a secondary battery, and a lithium secondary battery manufactured therefrom.

BACKGROUND

As a technology for mobile devices is developed and demand therefor is increased, a lithium secondary battery has been commercially available and widely used, and among them, a lithium secondary battery having high energy density and voltage has been rapidly and increasingly demanded.

However, an anode of the existing lithium secondary battery is designed with a low energy density, such that even though a graphite-based anode material is simply used, there is no limitation in manufacturing the anode. However, when it is attempted to manufacture an anode having high capacity and high density by the same method, there are problems in that manufacturing yield is not obtained at the same level as the existing electrode having a low energy density, and lifespan and resistance characteristics are deteriorated.

Japanese Patent Publication No. 4760379 (Jun. 17, 2011) is provided as a similar related art.

RELATED ART DOCUMENT (Patent Document 1) Japanese Patent Publication No. 4760379 (Jun. 17, 2011)

SUMMARY

An embodiment of the present invention is directed to providing an anode for a secondary battery having improved lifespan and resistance characteristics by decreasing a volumetric expansion rate and increasing adhesion strength between an anode mixture and a current collector, and a lithium secondary battery manufactured therefrom.

In one general aspect, there is provided an anode for a secondary battery including: a first anode active material; and a second anode active material having relatively lower hardness than that of the first anode active material, wherein the first anode active material and the second anode active material satisfy the following Relational Formula 1, and have a volume ratio of 1:0.5~2:

$$0.167 < R_B/R_A < 1 \qquad \text{[Relational Formula 1]}$$

(in Relational Formula 1, $R_A$ is an average particle size of the first anode active material, and $R_B$ is an average particle size of the second anode active material).

In another general aspect, there is provided a lithium secondary battery manufactured by including the anode for a secondary battery as described above.

DETAILED DESCRIPTION OF EMBODIMENTS

Figure 1A:
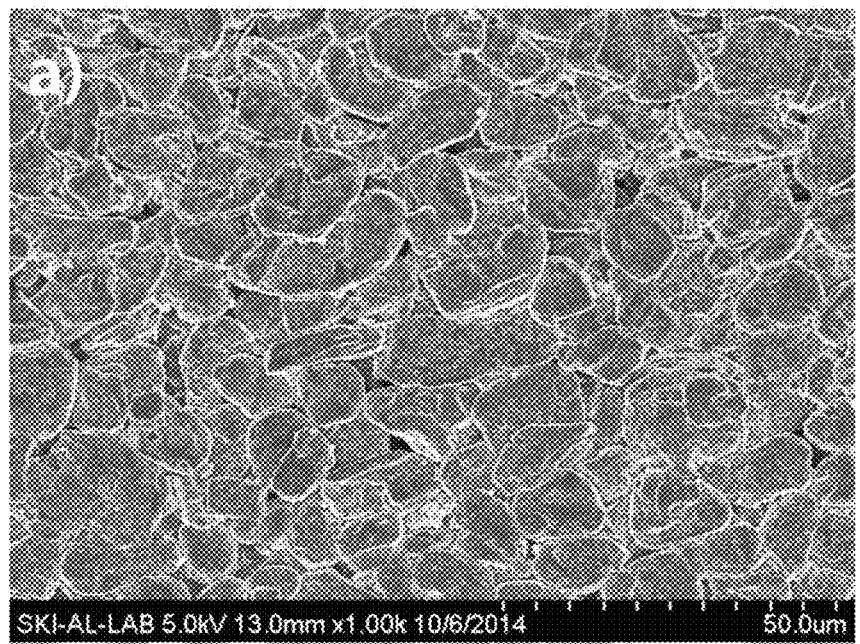
FIG. 1(a) is a scanning electron microscope (SEM) image of an upper surface after rolling an anode for a secondary battery according to Example 1.
Figure 1B:
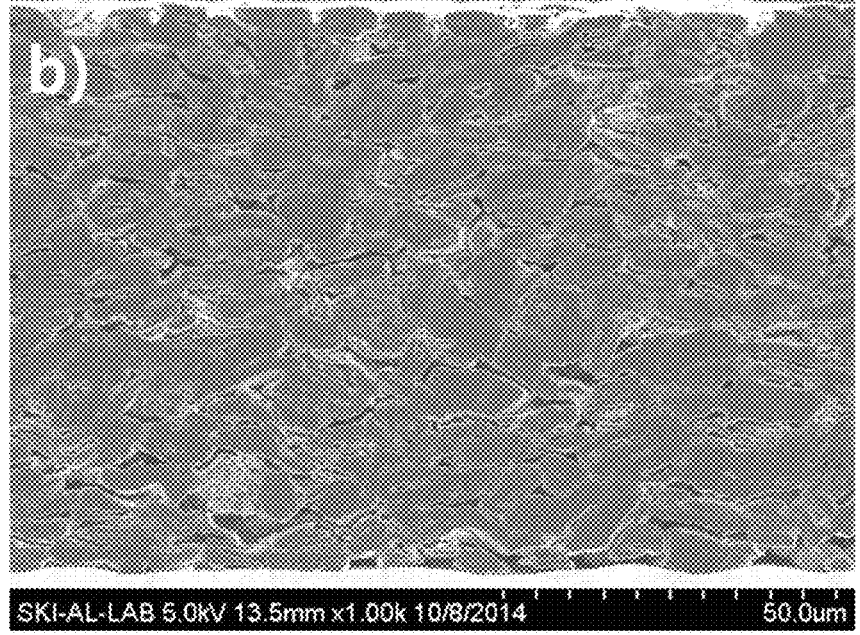
FIG. 1(b) is a scanning electron microscope (SEM) image of a cross-section (side surface) after rolling an anode for a secondary battery according to Example 1.
Figure 2A:
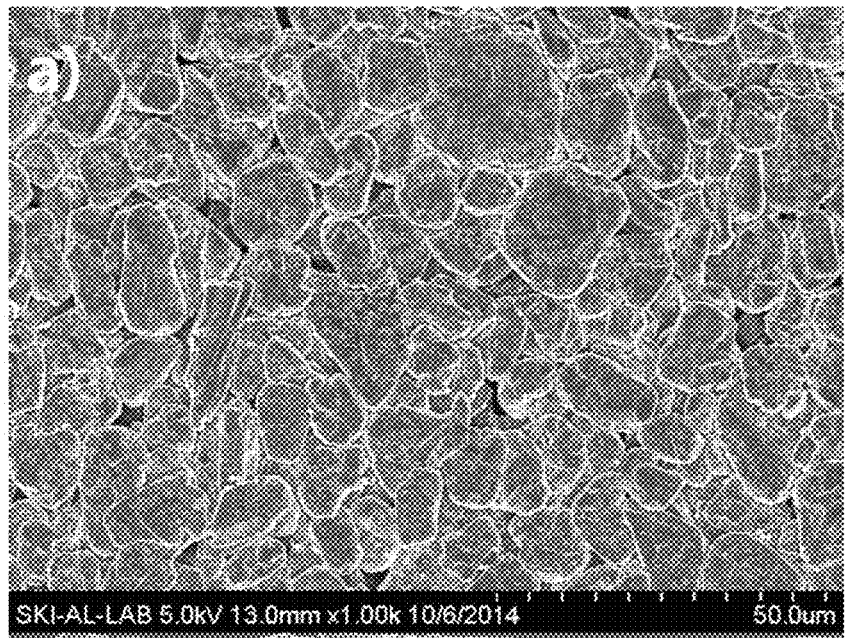
FIG. 2(a) is a scanning electron microscope (SEM) image of an upper surface after rolling an anode for a secondary battery according to Comparative Example 1.
Figure 2B:
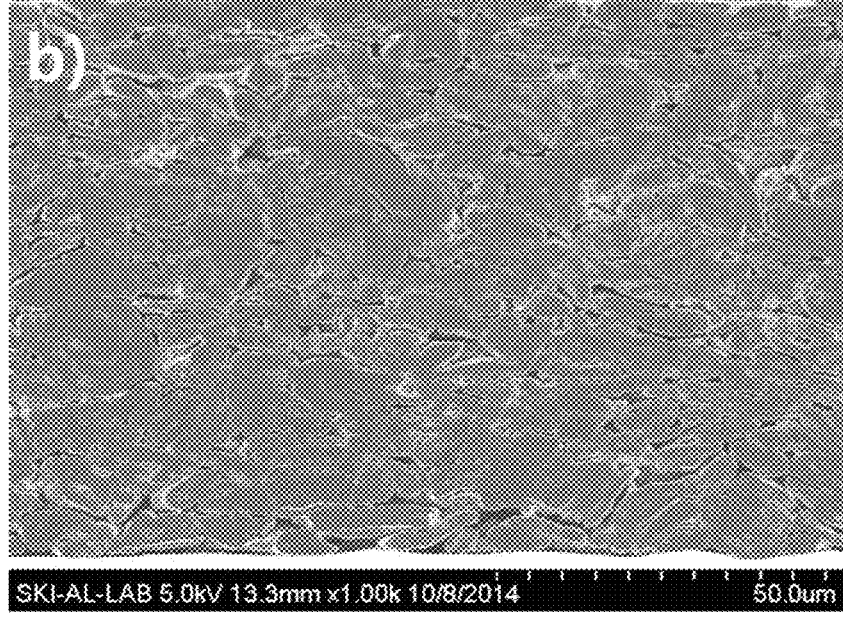
FIG. 2(b) is a scanning electron microscope (SEM) image of a cross-section (side surface) after rolling an anode for a secondary battery according to Comparative Example 1.
Figure 3:
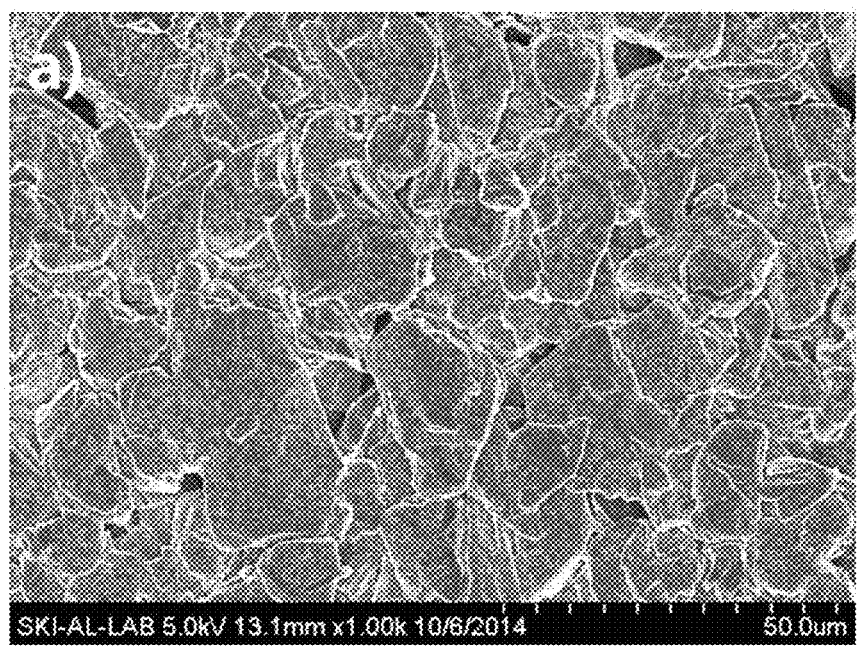
FIG. 3(a) is a scanning electron microscope (SEM) image of an upper surface after rolling an anode for a secondary battery according to Comparative Example 2.
FIG. 3(b) is a scanning electron microscope (SEM) image of a cross-section (side surface) after rolling an anode for a secondary battery according to Comparative Example 2.
Figure 3B:
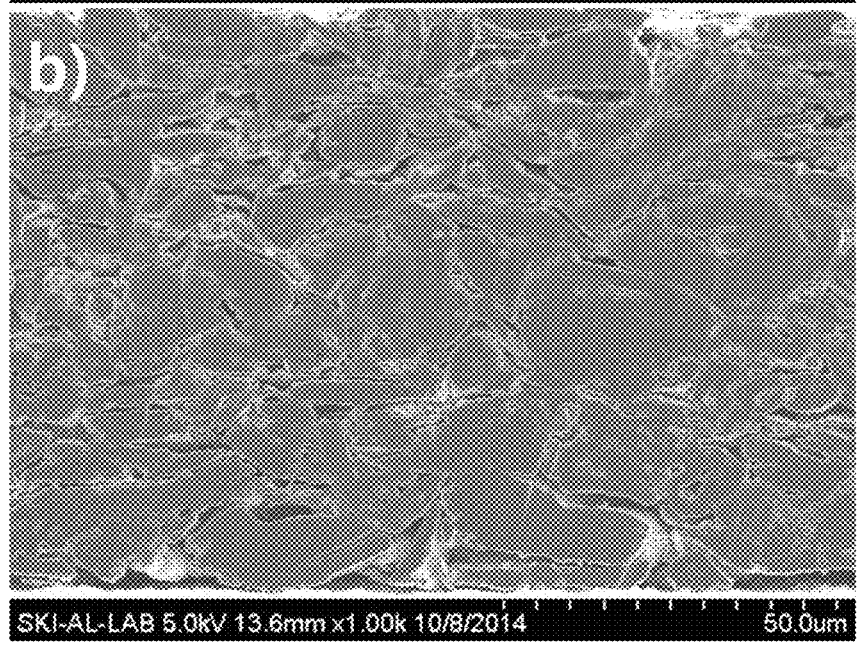
Figure 4A:
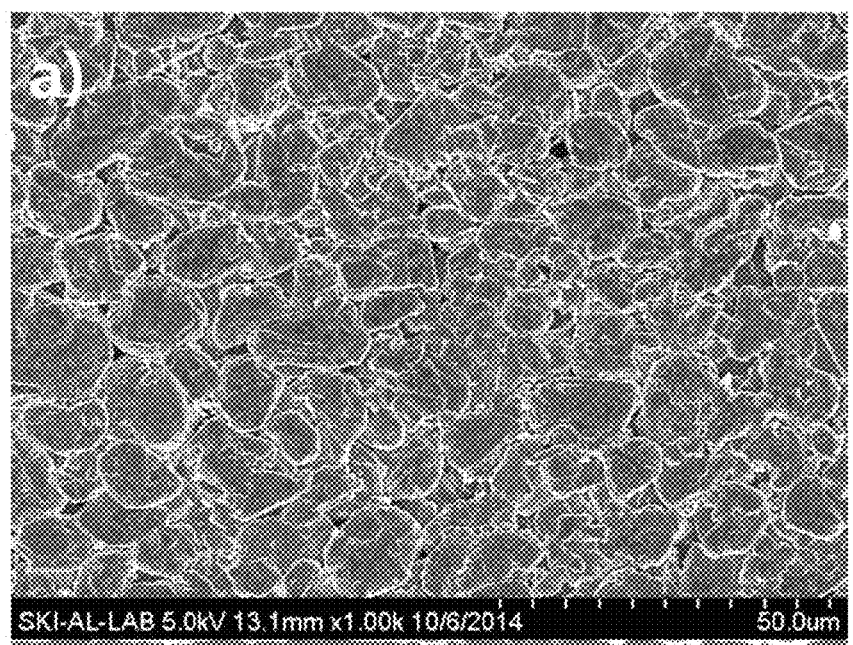
FIG. 4(a) is a scanning electron microscope (SEM) image of an upper surface after rolling an anode for a secondary battery according to Comparative Example 3.
Figure 4B:
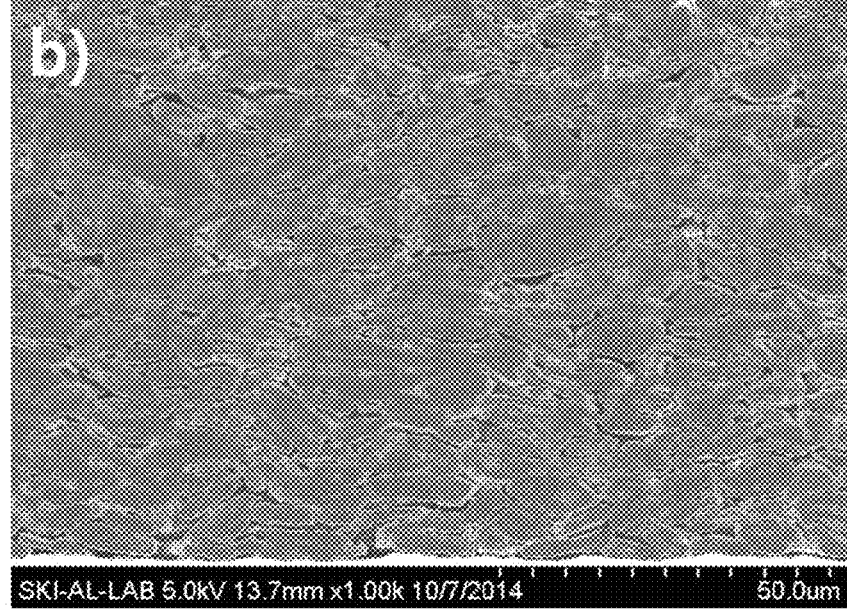
FIG. 4(b) is a scanning electron microscope (SEM) image of a cross-section (side surface) after rolling an anode for a secondary battery according to Comparative Example 3.

Hereinafter, an anode for a secondary battery according to the present invention and a lithium secondary battery manufactured therefrom will be described in detail with reference to the accompanying drawings. Meanwhile, unless technical and scientific terms used herein are defined otherwise, they have meanings understood by those skilled in the art to which the present invention pertains. Known functions and components will be omitted so as not to obscure the description of the present invention with unnecessary detail.

The present invention relates to an anode for a secondary battery including: a first anode active material; and a second anode active material having relatively lower hardness than that of the first anode active material, wherein the first anode active material and the second anode active material satisfy the following Relational Formula 1, and have a volume ratio of 1:0.5~2:

$$0.167 < R_B/R_A < 1 \qquad \text{[Relational Formula 1]}$$

(in Relational Formula 1, $R_A$ is an average particle size of the first anode active material, and $R_B$ is an average particle size of the second anode active material).

Specifically, $R_A$ may be 10 μm to 40 μm, but the present invention is not limited thereto.

In detail, in the anode for a secondary battery manufactured by mixing the first anode active material and the second anode active material, two anode active materials having different hardness may be used to increase structural stability of the anode, thereby improving performance of the anode. Specifically, at the time of performing a rolling process, when the first anode active materials having relatively high hardness serve as a support, some of the second anode active materials having relatively low hardness are crushed and filled in pores formed by the first anode active materials to thereby increase structural stability among anode active material particles, such that a volumetric expansion rate of the anode by charging and discharging may be decreased, and as a size of the pores becomes decreased, adhesion strength between the anode mixture and the current collector may be improved. As described above, the anode for a secondary battery according to the present invention may have a low volumetric expansion rate and high adhesion strength to provide excellent lifespan and resistance characteristics.

More preferably, the first anode active material may satisfy the following Relational Formula 2, and the second anode active material may satisfy the following Relational Formula 3. By using the first and second anode active materials having different hardness and satisfying Relational Formulas 2 or 3, respectively, structural stability may be more improved, such that the volumetric expansion rate may be further decreased and higher adhesion strength may be provided. Here, in Relational Formula 2, the lower limit may be determined as the lowest value that is capable of being substantially measured by the first anode active material. Specifically, for example, the lower limit in Relational Formula 2 may be 0.01, but the present invention is not limited thereto. In Relational Formula 3, the upper limit may be determined as a value that is capable of being measured by the second anode active material having hardness in which fine pores may remain even after the rolling process. Specifically, for example, the upper limit in Relational Formula 3 may be 0.6, but the present invention is not limited thereto.

$$\Delta R_A/R_A \leq 0.1 \qquad \text{[Relational Formula 2]}$$

$$\Delta R_B/R_B \geq 0.3 \qquad \text{[Relational Formula 3]}$$

In Relational Formula 2 or 3, $R_A$ is an average particle size of the first anode active material, $\Delta R_A$ is an average particle size variation of the first anode active material when applying pressure, $R_B$ is an average particle size of the second anode active material, and $\Delta R_B$ is an average particle size variation of the second anode active material when applying pressure. Here, the average particle size variation of the first anode active material and the second anode active material may be an average particle size variation when applying pressure of 30 MPa to each of a number of sample particles using a tip, etc., wherein the plurality of sample particles may indicate 5 or more of sample particles.

In order that some of the second anode active materials having relatively low hardness are crushed and filled in pores formed by the first anode active materials as described above, it is important to properly control the average particle size of the first and second anode active materials and a mixed ratio between the first and second anode active materials.

First, the average particle size of the first anode active material and the second anode active material preferably satisfies the Relational Formula 1, wherein the lower limit in Relational Formula 1 is less than 0.167, which is obtained by considering a closest packing structure in which the first anode active material particles are closely (densely) packed due to the rolling process. Meanwhile, the closest packing structure may be calculated on the basis of a case where the first anode active material and the second anode active material have a spherical shape and are mixed at a volume ratio of 5:5. However, this case is an example, and the shapes of the first anode active material and the second anode active material are not limited to the spherical shape, and may be each independently a spherical shape, a square shape, an oval shape, a plate-type shape, a mixed shape thereof, etc.

Specifically, when the spherical shaped first anode active material particles are the most closely stacked by the rolling process, the particles may be packed into a hexagonal close-packing (hcp) structure and a face-centered cubic (fcc) structure, and accordingly, a tetrahedral site surrounded by four particles and an octahedral site surrounded by six particles may be formed. Therefore, when the first anode active material and the second anode active material are mixed at the same volume ratio, all of the second anode active materials having an excessively small particle size are filled in the gap, that is, pores, such that the first anode active material and the second anode active material are not closely bound to each other, and an increase in structural stability among the anode active material particles may not be expected. Due to the above-described problem, the average particle size of the second anode active material is preferably larger than the maximum particle size of the second anode active material filled in the pores. Specifically, it is preferred that the average particle size of the second anode active material is more than 0.167 in order to increase structural stability. Meanwhile, when the average particle size of the second anode active material is excessively large, that is, over the average particle size of the first anode active material, contact between the first anode active materials is prevent by the second anode active material, such that the first anode active material does not sufficiently serve as a support, whereby the increase in structural stability may not be expected similar to the above case. Accordingly, the volumetric expansion rate of the anode may be increased, and the lifespan characteristic and the resistance characteristic of the anode may be deteriorated.

More preferably, the average particle size of the first anode active material and the second anode active material may satisfy the following Relational Formula 4, wherein in Relational Formula 4, $R_A$ is an average particle size of the first anode active material, and $R_B$ is an average particle size of the second anode active material. Specifically, $R_A$ may be 12 μm to 24 μm, but the present invention is not limited thereto.

$$0.333 < R_B/R_A < 0.833 \qquad \text{[Relational Formula 4]}$$

In addition, the volume ratio of the first anode active material and the second anode active material is preferably 1:0.5~2. When the content of the second anode active material is excessively larger than that of the first anode active material by more than 2 volume-fold, the first anode active material serving as the support is not sufficient, such that structural stability may be decreased, and in addition, the ratio of the second anode active material having relatively low hardness is increased, such that the volumetric expansion rate may be increased. On the contrary, when the content of the second anode active material is excessively smaller than that of the first anode active material by less than 0.5 volume-fold, the pores are not sufficiently filled, such that the first anode active material and the second anode active material may not be sufficiently bound to each other, and accordingly, structural stability may be decreased, such that the volumetric expansion rate may be increased, and the binding strength between the anode mixture and the current collector may be decreased. More preferably, the volume ratio of the first anode active material and the second anode active material may be 1:0.8~1.2.

In addition, the anode for a secondary battery according to an exemplary embodiment of the present invention may further include an additive including 0.1 to 10 parts by weight of a conductive material and 0.1 to 10 parts by weight of a binder based on 100 parts by weight of the first anode active material and the second anode active material. By using the conductive material and the binder satisfying the above-described range, the increase in structural stability obtained by filling the second anode active materials in pores formed by the first anode active materials, may not be interrupted, and electric conductivity and the binding strength among particles may be increased to further improve performance of the anode.

The first anode active material and the second anode active material according to an exemplary embodiment of the present invention may be each independently natural graphite or artificial graphite, and preferably, the first anode active material may be artificial graphite, and the second anode active material may be natural graphite.

The conductive material according to an exemplary embodiment is a material functioning as a moving path of electrons produced by the reaction, and may be used without particular limitation as long as it is an electroconductive material that does not cause chemical change in electrochemical materials. Specifically, the conductive material may be at least any one selected from carbon blacks such as Super-P, carbon black, acetylene black, Ketjen black, channel black, furnace black, lamp black, thermal black, etc.; metal powders such as carbon fluoride, aluminum, nickel, stainless steel powders, etc.; conductive whiskers such as zinc oxide, potassium titanate, etc.; conductive metal oxides such as titanium oxide, etc.; and conductive materials such as a polyphenylene derivative, etc.

The binder according to an exemplary embodiment of the present invention is a component for more effectively performing a combination of additives such as the anode active material, the conductive material, etc., and a combination between the anode mixture and the current collector, etc. The binder is not specifically limited, but may be used as long as it is generally used in the art. For example, the binder may be at least one selected from the group consisting of polyvinylidene fluoride (PVdF), hexafluoro propylene (HFP), polyvinylidene fluoride-co-hexafluoro propylene, polyvinylidene fluorideco-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, pullulan, cyanoethylsucrose, carboxyl methyl cellulose, acrylonitrile-styrene-butadiene copolymer, polyimide, etc.

As described above, the anode for a secondary battery according to an exemplary embodiment of the present invention may have a low volumetric expansion rate and high binding strength between the anode mixture and the current collector. Specifically, the volumetric expansion rate according to an exemplary embodiment of the present invention may be 20 vol % or less. When the volumetric expansion rate is excessively high, a structure of the anode may be changed due to a phenomenon such as distortion, etc., such that lifespan and resistance characteristics may be deteriorated, which is not preferable. The binding strength according to an exemplary embodiment may be 0.35N or more. When the binding strength between the anode mixture and the current collector is excessively low, the anode mixture and the current collector may be partially separated, which is not preferable.

Further, the present invention provides a lithium secondary battery manufactured by including the anode for a secondary battery. As described above, the anode for a secondary battery according to the present invention may have a low volumetric expansion rate and high adhesion strength between the anode mixture and the current collector to provide excellent lifespan characteristic and resistance characteristic, and the lithium secondary battery manufactured by including the anode for a secondary battery may also have excellent lifespan and resistance characteristics.

Hereinafter, the anode for a secondary battery according to an exemplary embodiment of the present invention will be described in more detail. Physical properties of secondary batteries manufactured by Examples and Comparative Examples were measured as follows.

(Lifespan Characteristic)

Evaluation of lifespan characteristic was performed by manufacturing cells each having 10 Ah or more of large capacity using the same cathode, and measuring the lifespan characteristic in a chamber maintained at a constant temperature (35° C.) determined within the DOD90 range at 1C charge/1C discharge c-rate.

(Volumetric Expansion Rate)

Five coil cells were manufactured by using a lithium metal as a cathode in the same method and charged by 0.1C. Each thickness of the electrodes before and after being charged was measured by a micro-meter, and an average value of five cells was calculated.

(Adhesion Strength)

A 3M tape was attached onto the electrode, and then power strength applied when detaching the tape from the electrode at the same angle (perpendicularly) and the rate (360 rpm), was measured.

Example 1

An anode active material was prepared by mixing artificial graphite having an average particle size of 18 μm with natural graphite having an average particle size of 12 μm at a volume ratio of 5:5, and a binder was a water-based binder prepared by mixing styrene-butadiene rubber (SBR) with carboxymethyl cellulose (CMC) at a ratio of 5:5, and carbon black was prepared as a conductive material.

The prepared anode active material, the prepared binder, and the prepared conductive material were mixed at a weight ratio of 96:2:2, and the mixture was dispersed in water, thereby preparing an anode slurry. The anode slurry was coated onto a copper thin film and dried, followed by a rolling process at a pressure of 3.8 MPa, thereby manufacturing an anode for a secondary battery.

A nickel-cobalt-manganese (NCM)-based cathode was prepared as a cathode, and an electrolyte was a solution prepared by including 1M of LiPF6 and mixing ethylene carbonate, ethyl methyl carbonate, and diethyl carbonate at a volume ratio of 1:1:1.

The anode, the cathode, and the electrolyte were used to manufacture a coin lithium secondary battery, and physical properties of the battery were shown in Tables 2 and 3.

Examples 2 and 3, and Comparative Examples 1 to 4

All processes were performed by the same method as Example 1 except for using each anode active material satisfying Table 1 below, and physical properties of the battery were shown in Tables 2 and 3.

TABLE 1

| | Mixed Ratio (Artificial Graphite: Natural Graphite) | Average Particle size (μm) | | | |
|---|---|---|---|---|---|
| | | Artificial Graphite | Natural Graphite | $\Delta R_A/R_A$ | $\Delta R_B/R_B$ |
| Example 1 | 5:5 | 18 | 12 | 0.05 | 0.35 |
| Example 2 | 5:5 | 32 | 21 | 0.05 | 0.35 |
| Example 3 | 4:6 | 18 | 12 | 0.05 | 0.35 |
| Comparative Example 1 | 10:0 | 18 | — | 0.05 | — |
| Comparative Example 2 | 0:10 | — | 12 | — | 0.35 |
| Comparative Example 3 | 3:7 | 18 | 12 | 0.05 | 0.35 |
| Comparative Example 4 | 5:5 | 32 | 5 | 0.05 | 0.35 |

TABLE 2

| | Volumetric Expansion Rate (Vol %) | Adhesion Strength (N) |
|---|---|---|
| Example 1 | 19.05 | 0.39 |
| Example 2 | 19.11 | 0.38 |
| Example 3 | 19.14 | 0.38 |
| Comparative Example 1 | 23.46 | 0.29 |
| Comparative Example 2 | 19.75 | 0.26 |
| Comparative Example 3 | 25.16 | 0.31 |
| Comparative Example 4 | 27.48 | 0.23 |

As shown in Table 2 above, it could be appreciated in Examples 1 to 3 that the artificial graphite and the natural graphite having the appropriate mixed ratio, average particle size, and hardness were mixed with each other, such that the pores formed by the artificial graphite was filled with the natural graphite, whereby structural stability of the anode was increased, the volumetric expansion rate was decreased, and adhesion strength was increased.

On the contrary, it could be appreciated in Comparative Example 1 that only the artificial graphite having relatively high hardness was used, such that binding strength among the anode active material particles was not sufficient and structural stability was decreased, and accordingly, the volumetric expansion rate was high and the adhesion strength was low. It could be appreciated in Comparative Example 2 that only the natural graphite having relatively low hardness was used, such that the anode active material serving as the support was not present, and accordingly, the biding strength was significantly low. It could be appreciated in Comparative Example 3 that two anode active materials having different hardness were used, but the natural graphite having relatively low hardness was used in an excessive amount, such that structural stability of the anode was decreased, and the volumetric expansion rate was high. It could be confirmed in Comparative Example 4 that the natural graphite having a relatively small average particle size was used, some of the natural graphites were positioned in the pores, rather than crushed and filled in the pores formed by the artificial graphite, such that both of structural stability and binding strength were deteriorated.

TABLE 3

| | Lifespan Characteristic (%) | | | | |
|---|---|---|---|---|---|
| | Cycle 0 | Cycle 50 | Cycle 100 | Cycle 150 | Cycle 250 |
| Example 1 | 100 | 96.4 | 95.7 | 94.5 | 93.7 |
| Example 2 | 100 | 96.3 | 95.6 | 94.4 | 93.6 |
| Example 3 | 100 | 96.3 | 95.5 | 94.2 | 93.4 |
| Comparative Example 1 | 100 | 95.2 | 94.4 | 92.7 | 92.3 |
| Comparative Example 2 | 100 | 95.9 | 93.9 | 92.7 | 91.5 |
| Comparative Example 3 | 100 | 96.0 | 95.1 | 93.5 | 92.9 |
| Comparative Example 4 | 100 | 95.4 | 94.5 | 92.5 | 91.2 |

As shown in Table 3 above, it could be appreciated that lifespan characteristic of Examples 1 to 3 were more excellent than that of Comparative Examples 1 to 4. The reason is because the artificial graphite which is the first anode active material serves as a support, and the pores formed by the first anode active material is filled with the natural graphite which is the second anode active material, such that packing efficiency and structural stability of the anode are increased, and the volumetric expansion rate is decreased by the increase in structural stability, and the adhesion strength between the anode mixture and the current collector is increased.

In the anode for a secondary battery according to the present invention, when the first anode active materials having relatively high hardness serve as a support, some of the second anode active materials having relatively low hardness are crushed and filled in pores formed by the first anode active materials to thereby increase structural stability among anode active material particles, such that the volumetric expansion rate of the anode by charging and discharging may be decreased, and adhesion strength between the anode mixture and the current collector may be improved. Accordingly, the anode for a secondary battery according to the present invention may have excellent lifespan and resistance characteristics.

Hereinabove, although the anode for a secondary battery and the lithium secondary battery manufactured therefrom are described in the present invention by specific matters, limited exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scopes and spirit of the invention.

What is claimed is:

1. An anode for a secondary battery comprising:
a first anode active material; and
a second anode active material having relatively lower hardness than that of the first anode active material,
wherein the first anode active material and the second anode active material satisfy the following Relational Formula 1, and have a volume ratio of 1:0.5~2, and wherein the first anode active material comprises artificial graphite, and the second anode active material comprises natural graphite:

$$0.167 < R_B/R_A < 1 \qquad \text{[Relational Formula 1]}$$

wherein Relational Formula 1, $R_A$ is an average particle size of the first anode active material, and $R_B$ is an average particle size of the second anode active material.

2. The anode for a secondary battery of claim 1, wherein the first anode active material satisfies the following Relational Formula 2, and the second anode active material satisfies the following Relational Formula 3:

$$\Delta R_A/R_A \leq 0.1 \quad \text{[Relational Formula 2]}$$

$$\Delta R_B/R_B \geq 0.3 \quad \text{[Relational Formula 3]}$$

wherein Relational Formula 2 or 3, $R_A$ is an average particle size of the first anode active material, $\Delta R_A$ is an average particle size variation of the first anode active material when applying a pressure of 30 MPa, $R_B$ is an average particle size of the second anode active material, and $\Delta R_B$ is an average particle size variation of the second anode active material when applying a pressure of 30 MPa.

3. The anode for a secondary battery of claim 1, wherein the first anode active material and the second anode active material have a volume ratio of 1:0.8~1.2.

4. The anode for a secondary battery of claim 1, wherein a volumetric expansion rate of the anode for a secondary battery is 20 vol % or less.

5. The anode for a secondary battery of claim 1, further comprising: an additive including 0.1 to 10 parts by weight of a conductive material and 0.1 to 10 parts by weight of a binder based on 100 parts by weight of the first anode active material and the second anode active material.

6. A lithium secondary battery including the anode for a secondary battery of claim 1.

7. The anode for a secondary battery of claim 1, wherein the first anode active material and the second anode active material satisfy the following Relational Formula 4:

$$0.333 < R_B/R_A < 0.833 \quad \text{[Relational Formula 4]}$$

wherein Relational Formula 4, $R_A$ is an average particle size of the first anode active material, and $R_B$ is an average particle size of the second anode active material.

* * * * *